US011867461B2

(12) United States Patent
Kozlowski et al.

(10) Patent No.: US 11,867,461 B2
(45) **Date of Patent: *Jan. 9, 2024**

(54) AUTOMATED DRYING AND CURING CHAMBER

(71) Applicant: Pipeskin, LLC, Encinitas, CA (US)

(72) Inventors: Daniel Kozlowski, San Diego, CA (US); Cole Ducey, San Diego, CA (US); Renzo Garcia, San Diego, CA (US)

(73) Assignee: Pipeskin, LLC, Encinitas, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/544,836

(22) Filed: Dec. 7, 2021

(65) Prior Publication Data

US 2022/0276002 A1 Sep. 1, 2022

Related U.S. Application Data

(63) Continuation-in-part of application No. 16/577,318, filed on Sep. 20, 2019, now Pat. No. 11,193,712, (Continued)

(51) Int. Cl.
*F26B 21/08* (2006.01)
*F26B 9/06* (2006.01)
(Continued)

(52) U.S. Cl.
CPC ............ *F26B 21/08* (2013.01); *B28B 11/247* (2013.01); *F26B 9/06* (2013.01); *F26B 21/028* (2013.01); *F26B 21/10* (2013.01); *F26B 25/06* (2013.01)

(58) Field of Classification Search
CPC .......... F26B 21/00; F26B 21/09; F26B 21/08; F26B 9/06; F26B 21/028; F26B 21/10; F26B 25/06; B28B 11/847
(Continued)

(56) References Cited

U.S. PATENT DOCUMENTS 3,972,674 A 8/1976 Harrell
4,192,323 A 3/1980 Horne
(Continued)

FOREIGN PATENT DOCUMENTS

CN 104279850 1/2015

OTHER PUBLICATIONS

Automated Curing Buddy Cannabis Harvesting & Processing International Cannagraphic Magazine Forums. May 11, 2016.
(Continued)

*Primary Examiner* — Stephen M Gravini
(74) *Attorney, Agent, or Firm* — Lewis Kohn & Walker LLP; Kari Moyer-Henry

(57) ABSTRACT

Machines, systems and methods for curing materials, including organic and nonorganic materials, are described. In particular, machines, systems and methods for machines, systems and methods for materials, such as organic plant materials or inorganic materials, including cannabis materials. In particular, the present invention relates to machines, systems and methods for an automated drying and curing chamber machine for both personal and commercial applications, wherein the machine uses customized variable settings and laminar air flow dynamics via negative pressure to ensure the optimal curing and drying environment for plant materials are described.

16 Claims, 5 Drawing Sheets

Related U.S. Application Data which is a continuation of application No. 15/584,610, filed on May 2, 2017, now Pat. No. 10,422,579.

(51) Int. Cl.

| | |
|---|---|
| ***F26B 21/10*** | (2006.01) |
| ***B28B 11/24*** | (2006.01) |
| ***F26B 21/02*** | (2006.01) |
| ***F26B 25/06*** | (2006.01) |

(58) Field of Classification Search

USPC ........................................................ 34/582

See application file for complete search history.

(56) References Cited

U.S. PATENT DOCUMENTS

| | | | | |
|---|---|---|---|---|
| 4,470,422 | A | 9/1984 | Joubert et al. | |
| 4,559,956 | A | 12/1985 | De Lange et al. | |
| 4,790,335 | A | 12/1988 | Marley et al. | |
| 5,330,912 | A | 7/1994 | Toet et al. | |
| 5,529,315 | A | 6/1996 | Barrino | |
| 5,694,701 | A | 12/1997 | Huelsman | |
| 6,290,680 | B1 * | 9/2001 | Forsberg | A61M 5/24 141/237 |
| 6,972,413 | B1 | 12/2005 | Krogdahl et al. | |
| 7,877,895 | B2 | 2/2011 | Otsuka | |
| D672,084 | S | 12/2012 | Ducey | |
| 8,407,912 | B2 | 4/2013 | Hubbard, Jr. | |
| 8,445,034 | B1 | 5/2013 | Coles, Jr. | |
| 8,499,471 | B2 | 8/2013 | Coronella | |
| 8,753,696 | B1 | 6/2014 | Lewis | |
| 8,898,927 | B2 * | 12/2014 | Shan | F26B 23/00 236/51 |
| 9,221,027 | B2 | 12/2015 | Kuppler et al. | |
| 9,506,695 | B2 | 11/2016 | Kim | |
| 9,598,653 | B2 * | 3/2017 | Bland | C10L 9/08 |
| 10,422,579 | B2 * | 9/2019 | Kozlowski | F26B 21/10 |
| 10,443,935 | B2 * | 10/2019 | Knight | B01L 9/06 |
| 10,634,428 | B1 | 4/2020 | Peter | |
| 11,193,712 | B2 * | 12/2021 | Kozlowski | F26B 25/06 |
| 2012/0101620 | A1 | 4/2012 | Bendiksten | |
| 2015/0096189 | A1 * | 4/2015 | Hawes | A61L 2/12 34/474 |
| 2017/0094920 | A1 * | 4/2017 | Ellins | A01G 31/02 |
| 2017/0343227 | A1 * | 11/2017 | Mowris | F24F 11/62 |
| 2018/0320968 | A1 | 11/2018 | Kozlowski | |
| 2020/0080779 | A1 | 3/2020 | Kozlowski | |
| 2022/0276002 | A1 * | 9/2022 | Kozlowski | F26B 9/06 |

OTHER PUBLICATIONS

Cannabis Drying Equipment from the Expert in Cannabis Technologies, http://www.triqsystems.com/products/vulcan50.html; May 18, 2016.

Green Glass Medical Cannabis Marijuana Curing Jar Learn—Green Glass Jars, https://greenglassjars.com/products/greenglassjarshygrometermarijuanacuringjar, May 18, 2016.

MedTech Instruments, Curing Box, 2014.

* cited by examiner

AUTOMATED DRYING AND CURING CHAMBER

CROSS-REFERENCE TO RELATED APPLICATION

This application is a continuation in part of U.S. patent application Ser. No. 16/577,318, filed Sep. 20, 2019, now U.S. Pat. No. 11,193,712, which is a continuation of U.S. patent application Ser. No. 15/584,610, filed May 2, 2017, now U.S. Pat. No. 10,422,579.

FIELD OF THE INVENTION

The present invention relates to machines, systems and methods for drying and curing materials, such as organic plant materials or inorganic materials. In particular, the present invention relates to machines, systems and methods for an automated drying and curing chamber machine for both personal and commercial applications, wherein the machine uses customized variable settings and laminar air flow dynamics via negative pressure to ensure the optimal curing and drying environment for materials.

BACKGROUND OF THE INVENTION

Various materials are dried and cured through application of various environmental conditions of the surrounding environment. More specifically, organic materials, such as plant materials, are typically dried and cured after harvest. Drying and curing depends in part on temperature, humidity and air flow, and it is desirable to control and monitor those conditions in drying materials.

Prior art teaches the use of drying and curing chambers and speeding up the drying process by the use of humidifiers or dehumidifiers and fans and the control of temperature to dry plant materials and other materials.

For example, United States Patent Application 20150096189 to Hawes discusses a method for curing plant material comprising loading the material into a chamber, setting the humidity of the chamber to a first humidity level for a first time period, setting the humidity of the chamber to a second humidity level until the water content of the cannabis material reaches a first desired percentage. The method may further comprise setting the temperature of the chamber to a first temperature for the first time period.

U.S. Pat. No. 9,221,027 to Kuppler discusses a system having a curing chamber that contains the material to be cured and a gas that contains carbon dioxide. The system includes apparatus that can deliver carbon dioxide to displace ambient air upon loading the system, that can provide carbon dioxide as it is needed and as it is consumed, that can control carbon dioxide concentration, temperature and humidity in the curing chamber during the curing cycle and that can record and display to a user the variables that occur during the curing process.

U.S. Pat. No. 6,972,413 to Krogdahl discusses a system and device for delivery of light-based radiation energy to a curable material which is contained in a vessel. The system and device is for use with materials wherein light-based energy may be used to initiate the curing process. Such materials include, but are not limited to, adhesives such as epoxies or acrylics which contain photo initiators. With such materials, curing can be initiated by exposure to radiation in the electromagnetic spectrum such as ultraviolet (UV) or infra-red (IR) light.

U.S. Pat. No. 4,790,335 to Marley discusses a method and apparatus for curing tobacco and more particularly to a method and apparatus for curing tobacco which utilizes a dual chamber tobacco curer and a forced air system for separately curing the leaf and the stem.

U.S. Pat. No. 4,559,956 to De Lange discusses curing tobacco leaf in a curer where heated air is circulated through the curer and controlled so that a first temperature is maintained in the curer for a given period of time. During this period the relative humidity level is reduced to a desired level. Thereafter a maximum predetermined temperature difference is maintained between upper and lower zones in the curer to dry the leaf.

However, the prior art does not provide a machine, system and method that provides automated drying and curing chambers that use customized variable settings and laminar air flow dynamics via negative pressure to ensure the optimal curing and drying environment for materials.

SUMMARY OF THE INVENTION

Systems, machines and methods for using customized variable settings and laminar air flow dynamics via negative pressure to ensure the optimal curing and drying environment for materials are described. Certain aspects of the invention relate to systems, machines and methods include a chamber having multiple sides, an interior and an exterior defined by at least a portion of said sides, at least one opening in at least one side and at least two passages through at least one side; at least one sensor located in the interior of the chamber and in communication with a control system to convey measurements of the sensor; at least one flow housing connected to the exterior of the chamber proximate the two passages and having at least two additional passages; at least two motors and at least two fans located in the at least one flow housing, wherein the first fan is oriented to direct air through a first passage to the interior of the chamber and the second fan is oriented to direct air away from a second passage; wherein the motors open and close third and fourth passages to provide open and closed chambers and the first and second fans direct air through and away from the first and second passages when the chamber is open under the direction of a control system to provide laminar air flow via negative pressure; and wherein the control system directs the motors and fans based on sensor measurements and time.

Additional aspects of the invention include a chamber interior that is essentially air tight when the third and fourth passages are closed by the motors; a system or machine wherein the air directed through the chamber by the at least two fans when the passages are open comprises laminar air flow via negative pressure; an chamber interior comprised of at least one sub-chamber wherein the sub-chamber is comprised of sides and openings defined by at least one side to further facilitate air flow; a system, machine or method where measurements collected by sensors are conveyed to the control system and control system directs the motors and fans based on the measurements collected and where the measurements collected correspond to relative humidity of air within the chamber interior; a programmable control system that activates the motors and fans when the passages are closed and the chamber interior measurement exceeds a certain threshold wherein the motors open the passages and the fans blow air through the opened passages until the interior measurement drops below the threshold and which activates the motors and fans when the control system measures a predetermined time setting wherein the motors open the passages and the fans blow air through the opened passages until the passage of a certain interval of time; and a communication platform wherein the communication platform enables a user to monitor the chamber, program and monitor the sensor measurements and program the control system.

BRIEF DESCRIPTION OF THE DRAWINGS

The present application may be more fully appreciated in connection with the following detailed description taken in conjunction with the accompanying drawings.

DETAILED DESCRIPTION OF THE INVENTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein.

Aspects and features of the invention are designed to operate on combinations of drying and curing chambers and computer and display systems, including servers, and/or other like devices. While the details of the embodiments of the invention may vary and still be within the scope of the claimed invention, FIGS. 1 to 8 show at least one embodiment of the invention.

For a better understanding of certain aspects and features of the present invention, attention is drawn to the following:

Structural Components

Figure 1:
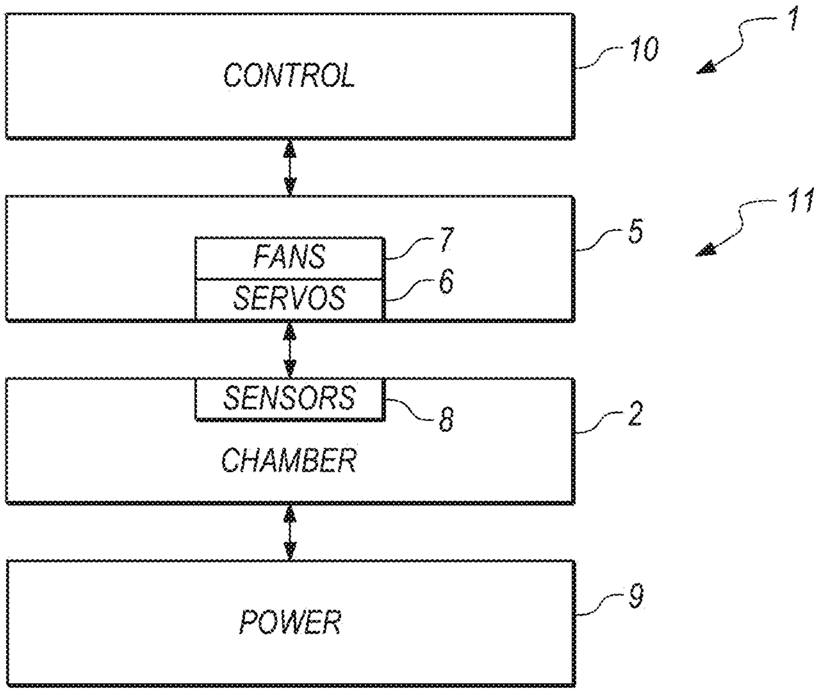
FIG. 1 shows a block diagram of components in accordance with at least one embodiment of the invention as a unit.
Figure 2:
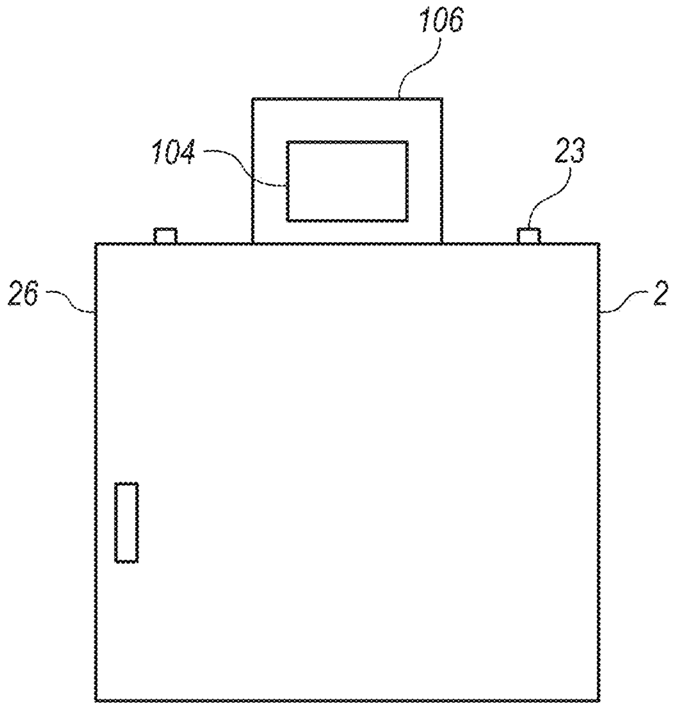
FIG. 2 illustrates a front view of the chamber of the unit, with the door closed, and with some computer control system components located at the top of the chamber in accordance with at least one embodiment of the invention.
Figure 3:
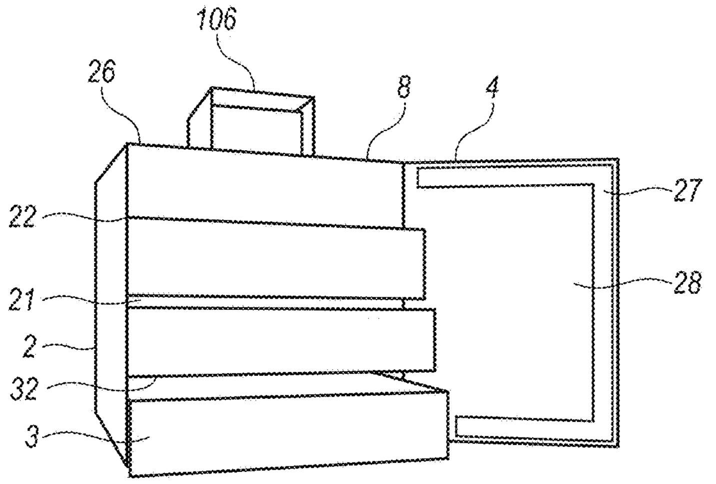
FIG. 3 illustrates a perspective view of an opened chamber of the unit and further with sub-chambers, including some partially opened, in accordance with at least one embodiment of the invention.

As shown in FIG. 1, the structural components of the invention, which may collectively comprise a unit 1, comprise at least one main chamber 2 for housing the materials to be cured in the interior 21 of the chamber. The chamber 2 can take a variety of forms (e.g., rectangular (cubelike), cylindrical or irregular), but it is preferably rectangular in form with openings 22, such as doors 28 (e.g., panels, cupboards, hatches) and passages 24 (e.g., air passages, conduits and vents), to access the interior and to provide pathways for passage of air into and out of the interior of the chamber (see, for example, as shown in FIG. 2). As shown in FIG. 3, the chamber preferably also includes one or more sub-chambers 3 (e.g., sub-chambers, shelves, tubs, containers) also for housing the materials to be cured in the interior of the chamber. Multiple main chambers 2 and sub-chambers 3 may be used in a unit 1. In the preferred embodiment, there is one main chamber 2 and multiple sub-chambers 3.

In general, as shown in FIGS. 1, 2 and 3, both the chamber 2 and sub-chambers 3 include sides 26 (e.g., walls (front, back, side), bases, tops) to define the interior 21 of the chamber and spaces within the sub-chambers 3 wherein materials may be contained and placed. The chamber 2 is preferably formed so as to be essentially air tight under certain conditions when closed, including when the interior 21 of the chamber is sealed and pressurized via motors 6 that control and opening and closing of passages 24 which help seal the chamber 2 and when air flow generated by fans is ceased as discussed below. Any suitable material may be used for the chamber 2 and sub-chambers 3. These preferably include acrylic, but may include any suitable plastic, or other materials such as wood or metal, including transparent or opaque materials, so that materials can be viewed without opening the chamber 2.

The invention's chamber 2 is preferably fabricated from laboratory grade acrylic (sub-chambers may be similar constructed), which limits off-gassing (e.g., giving off of chemicals, especially harmful ones, in the form of a gas) and is preferably welded together without the use of glues and/or adhesives. However, any suitable means of connection can be used, e.g., nuts and bolts, screws and other similar connectors, wedge and groove and other similar joinder construction, glues and adhesives, solders and welds, and any combination thereof). In the preferred embodiment, latches 23 pull tight a sealant lined door 28 for easy access and to create an air-sealed internal environment in interior 21 of the chamber 2. Preferably, rubber seals and neoprene rubber sealing adhesives are used as seals 27 and are preferably used to help form seals around or proximate the door openings 22, doors 28 and air passages 24 of the main chamber 2 as well as the flow housings 5 when the doors 28 and/or passages 24 are closed, as further described below.

Figure 4:
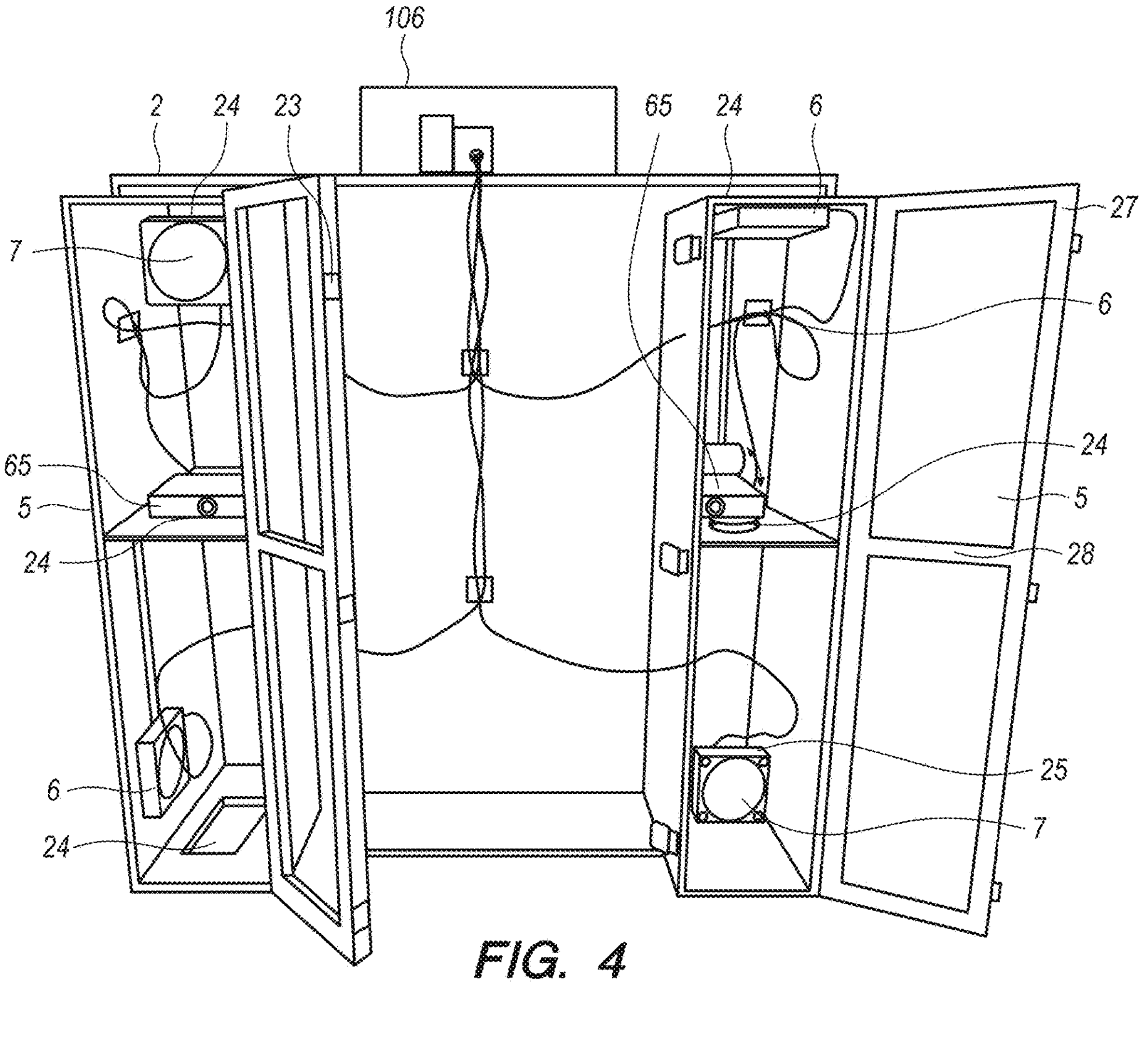
FIG. 4 illustrates a rear view of the main chamber, as well as flow housings including fans and motors/actuators over openings of the main chamber in accordance with at least one embodiment of the invention.

As also shown in FIGS. 1, 3 and 4, within the chamber 2, sensors 8 are mounted and used to measure and monitor environmental conditions, including at least preferably sensors 8 to take readings of both relative humidity (RH) % and temperature. Any suitable sensors 8 may be used, including for example, in the preferred embodiment, sensors for measuring humidity and temperature. As discussed further below, sensors 8 provide sensor data to the control system 10, including the computer controller 102, via any suitable communication means, such as data cables or wireless data transmission. Other environmental control apparatus may be similarly connected or integrated with or within the chamber 2, including for example humidifiers, heaters and coolers.

As shown in FIG. 3, in a preferred embodiment, multiple sub-chambers 3 are mounted within the chamber 2. These sub-chambers 3 are used to house materials within the chamber 2 to be dried and cured. As shown, they may be mounted within the chamber 2 in any manner common to sub-chambers 3, e.g., drawers, shelves, hanging containers and the like, such as by slides and guides. Any variety of suitable hinges, brackets, rollers and wheels may be used to facilitate opening, closing, locking the chamber 2 and the sub-chambers 3 within and movement of the sub-chambers 3. As noted above, any suitable material may be used for the sub-chambers 3, including preferably acrylic. Sub-chambers 3 are preferably removable from the chamber 2, so that contents may be transported to and from the chamber 2 via sub-chambers 3. Sub-chambers 3 may also include sub-chamber openings 32 to allow for air flow and passage of material. Preferably, sub-chambers 3 include sub-chamber openings 32, e.g., holes, other perforations, valves, in each of the respective bottom sides 26, e.g. bases, in order to ensure complete and uniform airflow throughout the chamber.

Figure 6:
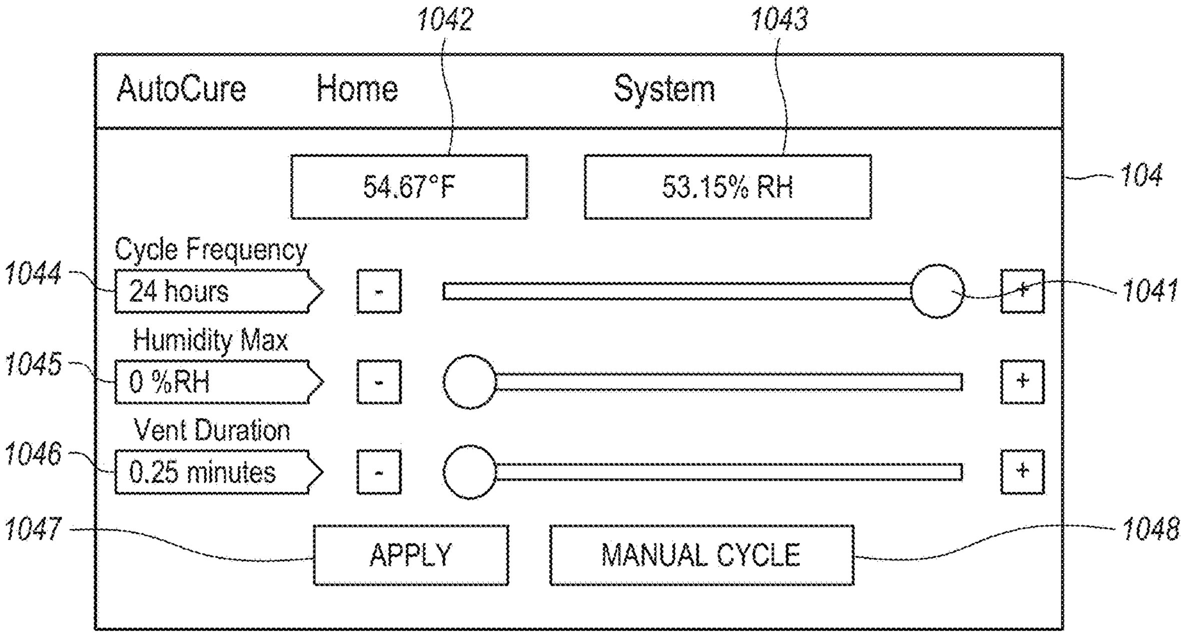
FIG. 6 illustrates the computer control including display screen at the top of the main chamber.
Figure 7:
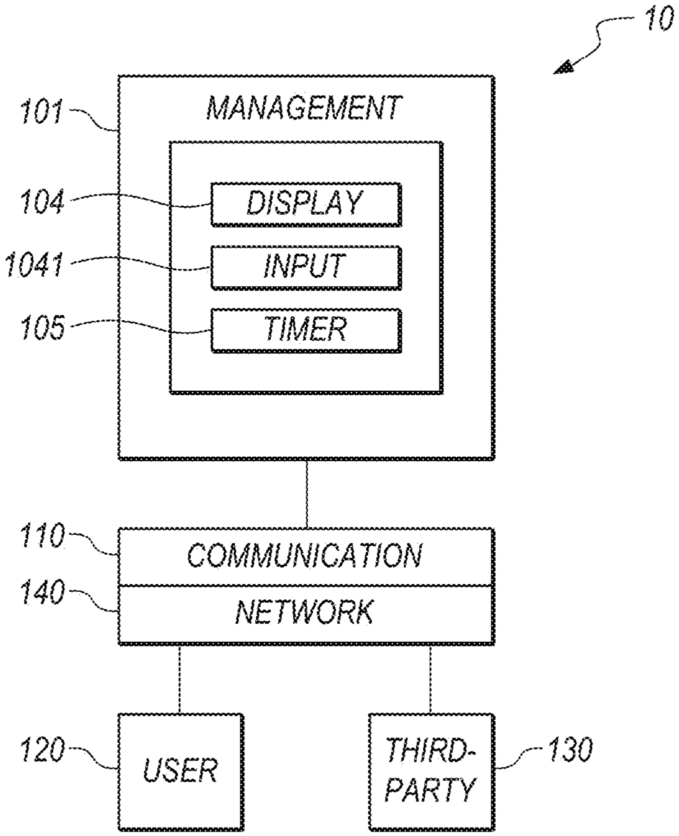
FIG. 7 illustrates a block diagram depicting a typical computer control system for managing curing and drying functions in accordance with at least one embodiment of the invention.

FIGS. 2, 3, 4 and 6 also show the computer controller 102 and display 104 mounted or placed at the top of the chamber 2 within a controller box 106 for ease of access, use and viewing. Preferably, the unit 1 includes an input device 1041 as well, such as the display 104 (via a touchscreen, for example) or any other variety of input devices, from keyboard, mouse to scan and other touch devices. The structure and function of the computer controller 102 and display 104 are described in more detail below. In short, as shown in FIGS. 1 and 7, control system 10 is in communication with and therefore can receive inputs and data from and provide outputs and instructions to and help and monitor control sensors 8, motors 6, fans 7, displays 104 and network 140. As discussed further below, control system 10, including computer controller 102, provides control functions for and to the unit 1 regarding time, humidity, motors 6, fans 7, sealing of the interior 21 and temperature. As further shown by the block diagram in FIG. 1, and FIG. 7, as well as FIG. 4, the control system 10 controls the fans 7 and motors 6 to drive and control the air pressure and flow and pressure within and through the chamber 2, flow housing 5 and their passages 24. Control system 10 controls these components in the course of opening and closing passages 24 to open and close the chamber 2 and flow housings 5, which provides an essentially air-tight seal of chamber 2 and parts of flow housing 5 in a closed position and which drives air flow via negative pressure through the chamber 2 and passages 24 in an open position.

A power source 9 is also included along with control system 10, including computer controller 102 and display 104, which are integrated or otherwise in communication or associated with the components, chamber 2 and sub-chambers 3 as further described below. Any suitable power source 9 may be used, including without limitation electric, solar, natural gas, or any combination thereof. Electrical power is used in the preferred embodiment.

As shown in FIG. 4, fans 7, motors 6, and other environment control devices if desired, such as heaters, humidifiers, by example in other embodiments, are placed in flow housings 5 mounted or otherwise sufficiently proximate to the chamber 2 in positions accessible to passages 24 of the chamber. Flow housings 5 further have door openings 22, doors 28, passages 24 and seals 27, similar to the main chamber 2 as referenced above, and similarly facilitating the provision of an essentially air tight seal of at least parts of the interior of the flow housings 5 (e.g., those sub-chambers within the flow housings 5 containing the fans 7) when passages 24 are closed. The fans 7 and motors 6 provide and control air flow for purposes of circulating air through the chambers 2 and sub-chambers 3 via such air passages 24. Any suitable powerable fan 7 may be used, including, for example, 2-5" ventilation fans. Any suitable motor 6 may be used, including those which have the capacity to be controlled and to power and move actuators 65, such as closing mechanisms, from and to open and closed positions, including by example servo motors, stepper motors and actuator motors. Heavy-duty venting servo motors are preferred. The motors 6 allow for control of the open or closed status of air passages 24, as well as angular or linear position, velocity and acceleration and also include sensors for position feedback and controller for control of the motors, sensing of the environment and communication with the control system 10. Preferably, the servo motors 6 include or are associated with actuators, which turn the motors on and off, and which, when activated, control and power mechanisms that cover and uncover passages 24, preferably in response to control system 10, including computer controller 102, including based on data and information monitored by sensors 8 and in view of the parameter of time. Other parameters can be used in connection with control or effect of the actuators of the servo motors.

Environmental Control

As shown in FIGS. 1 to 7, the invention provides a machine, system and method for curing materials, including components and controls to monitor and control the environment surrounding the materials. The computer controller 102 can be programmed to provide such monitorization and control automatically based on preset or variable conditions. The foregoing can be used for multiple sizes and types of materials and environmental conditions and end results for curing and drying, depending on user desires and settings, including pretested and established settings for certain desired results. Benefits of such control include, without limitation, exclusion of undesirable conditions and results, such as mold, rust, decay and unnecessary handling of materials, and inclusion of desirable conditions such as even and targeted temperature, humidity and air flow applied to the materials to be cured and dried.

In general, curing is often a secondary drying process that is done at a selectively slower or faster rate than hang-drying or other means of ambient environment drying in order to bring the finished product to a desired level of dryness, with consideration for the surrounding RH %, without destroying valuable properties of the materials, such as, in the case of cannabis, terpenes and oils. However, what is overlooked is that curing should be preferably executed in an air-tight environment that is separate from ambient humidity conditions. This allows the harvested material to mature in an environment that will not dry the product too fast and will stay mold free, if the air within the curing environment is vented (a.k.a., burped) at selected and/or desired times to adjust the RH % in the curing environment. Keeping that in mind, extended drying rooms and other humidity controlled environments are not preferable or reliable curing methods as the product is constantly subject to ambient RH %. The result can lead to evaporation and desiccation on one hand, or over-saturation and mold on the other if not tended with increasingly watchful eyes.

The present invention addresses all of these issues and consolidates the solutions into a single unit 1, machine and system. Preferably, based on measurements from the sensors 8 in the interior 21 of the chamber 2 over time, RH % and temperature are monitored by the control system 10, including computer controller 102, and pressure of and the air flow through the interior 21 of the chamber 2 are effected by the fans 7 and motors 6 over time according to preset conditions for RH % and time in the preferred embodiment, as well as temperature and other environmental and material factors in other embodiments.

Plant materials may be provided to the unit 1 after various steps upon harvest, for example, from fresh from the fields, to not fresh from the fields but rather after intermediate store or processing, and to freeze dried from the fields. The advantage of using materials freeze dried fresh from harvest in the fields is to reduce risk of mold or other decay of the plant materials and to preserve characteristics of the materials after harvest. For example, harvested materials, such as plant materials, including for example, cannabis flower, may be fresh frozen upon harvest out of the field. This creates immediate shelf stability so that the flower can be transported without risk of mold. The fresh frozen material may then be further freeze dried, using a commercial freeze dryer for example, to change composition from frozen to partially dried. Then the material may be added to unit 1 to cycle through the curing and drying process, including the venting and burping process described above and below to finish into cured plant materials, such as cured flower. This process will be extremely valuable for outdoor farmers growing on large acreage.

The fresh freeze step may proceed as follows, although other known methods of fresh freeze may be used. Flash freezing may be accomplished using a freezer at the harvest location. Freezers can cool air down to as low as −40° F. or below in a matter of minutes. This freezing air may then be circulated around the harvested plant materials that need to be preserved. A fast drop in temperature creates an atmosphere inside the freezer to crystallize the cellular structure of plant materials at a fast rate, while keeping qualities of the plant materials in tact (e.g., texture, potency of chemical compounds, chemical structure, flavor, nutritional value). That is, the materials are frozen so quickly that ice crystals don't form between the fibers of the plant materials. Through this method, ice crystals that form in the plant materials remain small, allowing moisture to remain in materials when they thaw.

The freeze drying step may proceed as follows, although other known methods of freeze drying may be used. In addition to the fresh freeze step above, an additional deep-freeze step may be applied, such as via a freezers, to keep the materials at a freezing temperature, including very low temperatures, such as down to −40° F. or below. A sublimation step may be incorporated, where the frozen material is turned to liquid or vapor in whole or in part. A drying step may be incorporated, where moisture is removed from the material by pressure, vacuum, condensation and/or heat.

Motors, Fans, Exhaust and Intake Passages

Accordingly, as shown in FIG. 4, on the exterior of the chamber 2, preferably there are two flow housings 5 (e.g., prisms, boxes, other structures, plug-in components, components or containers) for use in connection with air intake and exhaust control to and from the interior 21 of the chamber 2. Preferably, each flow housing 5 includes or otherwise provides space for or is associated with at least one motor 6 and one or more fans 7, all of which turn on and off, preferably under the control of the control system 10, in order to create and/or stop the ventilation of fresh air into and out of the interior 21 of the chamber 2 and also to remove, reduce and/or stop the transport of humid air from or into the chamber 2, which humid air created from the slow evaporation of the materials, such as the moisture from inside cannabis buds.

As referenced above, this unit 1 is preferably provided by a chamber shaped most generally as a cube. Preferably, at least one side 26, e.g. the front side, of the chamber 2 is fabricated to provide an opening 22 covered by a door 28 which is attached by a hinge and latched to the exterior of the chamber and can be opened and closed. Preferably, at least one side 26, e.g., the back side, of the chamber 2 (looking inside if front door were open) has two passages 24 cut through it which are preferably placed in the bottom-left and top-right corners of such back side 26 respectively (or visa-versa). These passages 24 act as the channel-way for fresh air to enter the interior 21 of chamber 2 as the inflow of air enters in the bottom-left of the back side 26 of the chamber 2 and for the exhausted air to exit the top-right of the back side 26 of the chamber 2. Electrical fans 7 are the mechanism that move air throughout the chamber 2, and they are placed adjacent to two or more passages 24 cut through the back side 26 of the main chamber 2. Preferably, fans 7 blowing inwards to the interior 21 of the chamber 2 are placed adjacent the bottom-left passage 24, while fans 7 blowing outwards are placed adjacent the top-right corner passage 24. The generation of air-flow that the fans 7 create relative to their aforementioned spacing and to the main chamber 2 creates a laminar air-flow process via negative pressure, which allows for essentially uniform coverage throughout the entire chamber 2. This enhances uniform drying and curing, because the entire set of materials in the interior 21 of the main chamber 2 are subject to the laminar air-current. Negative pressure refers to the evacuation of the entire contents of the main chamber 2 and/or any differential between the rate at which exhaust fans 7 blow or pull air out of the interior 21 and rate at which fans 7 blow air into the interior 21.

Figure 5:
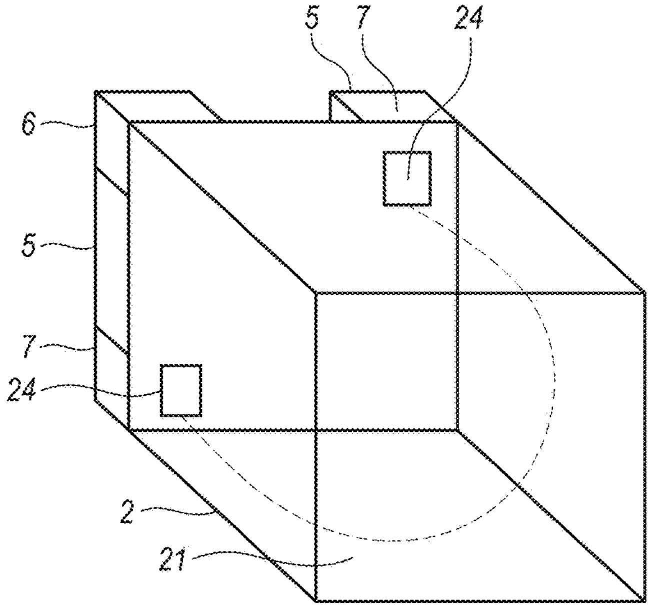
FIG. 5 illustrates laminar air flow through the chamber in accordance with at least one embodiment of the invention.

As shown in part in FIGS. 4 and 5, in a preferred embodiment, the left flow housing 5 is for exhaust and has two fans 7 and one motor 6. The right flow housing 5 is intake and has two fans 7 and one motor 6. So, between the two flow housings 5 there are four fans 7 and two motors 6. The function that the motors 6 (or any actuator) have is to open and close the passages 24, via plugs driven by arms and the motors 6 for example, to open and close the essentially air-tight seal of the interior 21 of the chamber 2.

Accordingly, as shown in FIG. 4, looking at the back (outside) of the main chamber 2 of unit 1, there are seen two flow housings 5 which are fastened to or otherwise associated with the main chamber 2 in a sealed fashion. The flow housings 5 are preferably and most generally shaped as rectangular prisms and surround the aforementioned fans 7 and motors 6. Motors 6 are preferably placed near the passages 24 of the chamber 2 to effect open and closed positions with respect to the passages 24 via mechanisms driven by the motors and which cover and uncover the passages 24 and which are therefore proximate the passages 24 (e.g., arms driven by the motors 6 that are connected to plugs that cover and uncover the passages 24, for example). When in the closed position, these covering mechanisms driven by motors 6 create a seal over respective passages 24, so that fresh air is not able to enter the chamber 2. When a venting (burping) period is in process, both the intake and exhaust motors 6 actuate the covering mechanisms to an open position, which venting period is calibrated and saved in software associated with the control system 10, including computer controller 102, whilst the fans 7 turn on to create the laminar air flow via negative pressure explained above. When a venting period ends, then both the intake and exhaust motors 6 actuate covering mechanisms to the closed position, which is also calibrated and saved in the software, whilst the fans 7 turn off, to create the essentially air-tight seal in the effort to eliminate air-flow. The mechanisms that cover and uncover passages 24 may comprise plugs comprising dampers or vents that maintain a closed position over a respective passage 24 when no air is passing through (such as via a weighted vent). Yet, when a motor 6 activates a fan 7 to blow air to or from a certain passage 24, the moving air opens the damper or vent (such as by swiveling on a mechanism fixing the damper or vent to the passage) and the passage 24.

As shown in FIG. 4, in a preferred embodiment, the motor 6, such as a servo motor, includes as an actuator 65, as a closing mechanism, that is, a spindle that has attached to it an "L" shaped arm with a plug fastened to it (e.g., at the bottom). The plug is capable of covering a passage 24 of the flow housing 5 (e.g., a circular plug can cover and uncover a circular passage, such as by the rotation around an axis, vertical movement along an axis, horizontal movement along an axis, articulation via joints and/or other movement of the actuator), so that when the motor 6 and actuator 65 are actuated to a closed position, the plug is moved to cover the passage 24. Conversely, when the motor 6 is actuated to an open position, and the plug is moved to uncover the passage 24, then the passage 24 is exposed. As such, preferably, the doors 28 on flow housings 5 remain closed during operation so airflow is forced through the passages 24, and the motors 6 close to create chambers within the flow housings 5 around the fans 7 and certain passages 24 to the interior of the chamber 2 and then open to facilitate a directed laminar airflow via negative pressure created by the fans 7 through the interior of chamber 2. Flow housings 5 also preferably have passages 24 that serve as vents for drawing in ambient air to be blown through the interior 21 of chamber 2 and for exhausting blown air back out to the environment outside of the chamber 2 and flow housing 5.

Accordingly, the foregoing structure and functionality allows the unit to selectively provide an essentially an air-tight chamber, selectively breaking the air-tight seal and selectively venting fresh ambient air via laminar air flow through the chamber 2 on command by the control of the CPU of the computer controller 102, as described further below.

Laminar Air Flow

FIG. 5 illustrates laminar air flow, including via intake and exhaust flow housings 5 and passages 24 through the interior 21 of the chamber 2, in accordance with at least one embodiment of the invention. The unit 1 of the invention uses customizable and variable settings and laminar air flow dynamics via negative pressure to allow preferred and optimal curing and drying environments. Laminar airflow is defined as air moving at generally the same speed and in the same direction, with minimal cross-over of air streams (or "lamina"). The invention utilizes laminar air flow dynamics, i.e., bottom to top and/or side to side within the chamber 2, via negative pressure via fans 7 to provide that saturated air contents are released from the interior 21 of the chamber 2 and new fresh air is evenly distributed. Additionally, dust filters 25 are preferably installed onto the intake and exhaust passages 24 of the chamber 2. As air is moved into and out of the chamber 2, these filters 25 remove dust and other materials from the air and help ensure that the contents are maintained in as favorable conditions as reasonably possible.

As illustrated by example in FIGS. 4 and 5, the spacing of the intake fan 7 and air passages 24, and the exhaust fan 7 and air passages 24, relative to the chamber 2 and flow housing 5 creates a laminar flow path for the air to take when a ventilation (burping) period is in-process. These passages 24 are situated separately from one another and on separate sides 26 or locations (e.g., different locations on one common side 26, such as the back) of the chamber 2 and flow housing 5 which facilitates laminar air flow when open and allow for essentially an air-tight environment when closed. Preferably, this laminar flow path starts at the bottom of a back side 26 of the chamber 2 and exits at the top of a back side 26 of the chamber 2 opposite thereto. Motors 6 and associated plugs are preferably placed adjacent or otherwise proximate to intake and exhaust passages 24 respectively, so that, when in a closed position, an essentially air-tight seal is created with respect to the interior 21 or the chamber 2. When in the closed position, the passages 24 are closed and the fans 7 are off concurrently in order to facilitate the creation of the essentially air-tight conditions. Alternatively, when the motors 6 and actuators 65 are in the open position, they break the air-tight seal created with respect the intake and exhaust flow housings 5 and associated passages 24, and the fans 7 concurrently turn on in order to move air throughout the interior 21 in the laminar air-flow path described.

The laminar air-flow path creates consistency of air flow throughout and across all of the contents within the chamber 2, because the air-flow within the chamber is taking a generally consistent pathway every time. A problem with conventional drying and curing methods is that consistency and ability to regulate thresholds constantly can be very difficult to achieve with HVAC systems (central air and/or fans), because the air-flow is much less uniform.

As shown in FIGS. 1 and 7, preferably, intelligent venting robotic software running on the computer controller 102, which can also be in communication with a network 140 for on-site and remote user and server input and control, is used to monitor and control the environment of the interior 21 of the chamber 2. Via the control system 10, such software and computer controller 102 controls the system of sensors 8, fans 7 and motors 6 with actuators 65 to create an essentially air-tight environment in the interior 21 of the chamber 2, including at least in part on the opening and closing of the passages 24 and the passage or non-passage of air therethrough and/or pressure of air in the interior 21 of the chamber 2. Accordingly, the contents of air in the interior 21 of the chamber 2 can be recycled based on or with ambient environmental conditions once certain user-denoted or otherwise predetermined values are met and/or exceeded.

Accordingly, and more particularly, a significant feature of the invention is venting or burping. Burping/venting occurs when the unit's 1 threshold settings (e.g., time, RH % and/or temperature) are exceeded. The unit 1 burps, that is, fans 7 turn on and motors 6 and associated actuators 65 open, for a certain amount of time, preferably such as either (1) the amount of time chosen (e.g., via a toggle slider or other selectable icon on the display 104) for "Vent Duration" and via the computer controller 102, or (2) at the discretion of the user in manually turning on and off the burping/venting function.

Accordingly, preferably, the invention does not use internal humidifiers or de-humidifiers. Rather it allows an air-tight environment for material, such as harvested plant material, to transfer moisture from the material into the surrounding air within the chamber 2 via transference due to evaporation. When moisture is added to the air (loss from material) in the essentially air-tight setting, relative humidity levels rise which are registered by the humidity and/or temperature sensors 8 inside the chamber 2. As the material loses moisture via drying and curing, the surrounding environment becomes more humid. Thus, the invention vents the air contents of the chamber 2, via the air passages 24 and motors 6 and fans 7, in order to bring the relative humidity back down to ambient conditions and/or create air-flow for a period of time.

Via the sensors 8, the relative humidity and temperature of the air in the interior 21 of the chamber 2 can be monitored along a timeline. Also, values of target humidity and relative humidity over time are preferably selected by users or by predetermined programs or other methods or protocols and displayed on a display 104, such as a touchscreen device, which is preferably mounted on a controller box 106 on the chamber 2 for purposes of providing an efficient user-interface. The values are categorized by time and relative humidity thresholds, which act as parameters for the chamber 2 to vent itself. Preferably, the touchscreen display 104 also provides a toggle-option for controlling the duration of the venting period itself ranging from continuous venting to rarely within a 24 hour period. Continuous venting would most commonly result in a drier end-product, while the opposite would slow the process.

Preferably, the RH % threshold triggers a burp/vent when the internal sensor 8 readings exceed the threshold setting which is toggled or otherwise selection on via the display 104. In terms of the time threshold, the unit has an internal counter or timer 105 that continues until the threshold is reached, then the unit 1 will burp/vent and start the process over and over again.

Accordingly, preferably, venting/burping may be controlled by RH % thresholds based on the RH % of the interior 21 of the chamber 2, as well as time duration. Temperature may also be used. The main chamber 2 and air passages 24 may remain with motors 6 closed and fans 7 off for a significant amount of the time. During this time, the contents, such as a cannabis flower, will be releasing moisture into the air inside the main chamber 2, via natural moisture transference, which raises the relative humidity of the air in interior 21 of the chamber 2 when compared to the ambient RH % in the surrounding room. When the content (e.g., flower) has released so much moisture that it has increased the internal RH % to hit a threshold value, a venting/burping process is activated.

The venting/burping process length of time is also selectable, such as being set by a user or predetermined by software. In general, the longer the setting of the time duration, then more fresh air will blow onto the contents over time, thus creating a more drying environment over time. While, the shorter the setting of the time duration, then less air will blow onto the contents due to shorter time. With that in mind, the unit exhausts moist air into the ambient room or other location of the chamber 2, which will cause the ambient RH % to rise. When this happens, in general, the unit 1 of invention will vent or burp the chamber 2 more frequently or continuously, because wetter air is being vented/burped into the chamber 2. Preferably, the unit 1 is placed in a controlled dry-room which keeps ambient RH % below 50% with a central dehumidifier unit or HVAC system.

Vents/burps can be also controlled based solely on time rather than the RH % or in combination with a RH % threshold. For example, essentially, if the timer 105 is set to a certain value, such as 2 hours, then the unit 1 will vent/burp itself once every 2 hours regardless of if the RH % threshold is triggered or not. Preferably, users of the unit 1 base their drying/curing off of the RH % threshold, and they set the time threshold to 24 hours, and let the RH % threshold trigger the venting. With all the said, preferably, the unit 1 will be set to always vent/burp itself at least once each 24 hour period via the time threshold, even if the RH % threshold was not met/exceeded within that time frame.

Preferably, temperature is more of a passive variable in the drying/curing process. Accordingly, the sensors measure and the computer controller displays corresponding temperature readings, but, preferably, there are not venting parameters/settings based off of temperature. However, in accord with the structure and control functionality described above, temperature could be incorporated into the unit 1 of the invention as a parameter to control or contribute to the control of the venting/burping process.

The unit 1 and control system 10 can further use moisture content % sensors 8 on or in the plant materials and cross reference of readings from them with readings of relative humidity (RH %) sensors 8 of the air inside the chamber 2. Using Vapor Pressure Differential calculations (VPD, which refers to the difference between the amount of moisture in the air and how much moisture the air can hold when it is saturated) in conjunction with moisture content sensors 8 for the plant material itself, algorithms can be created for desired parameters settings. The moisture content readers are comprised of sensors 8 and operated with software via system 10. These probe the plant material (e.g., flower) itself for moisture content % rather than the RH % in the air, which additional sensors 8 record (along with temperature), also under the control of system 10 and associated software applications. When moisture content % sensors 8 and relative humidity sensors 8 are cross referenced, this provides a more accurate overall picture of the drying, curing and storage processes than the use of air sensors 8 alone. As such, this provides better data to apply to algorithms for venting and burping and the remainder of the drying and curing process.

The unit 1 and system 10 of invention includes a feature called "Storage Mode," which occurs at the very end of the process. After the unit 1 has been actively venting itself and slowly removing moisture from the plant material, the unit stops venting entirely and the plant material is able to sit in the airtight chamber 2 without any airflow while remaining at prime relative humidity levels, such as approximately 60%. This is called the Equilibrium Moisture Content, which means that inside the chamber 2 there is an equilibrium between the moisture content in the air and the plant material.

The Equilibrium Moisture Content can be an ultimate goal of curing, because it allows the contents (e.g., cannabis flower) to continue curing/aging without any further desiccation caused by air flow movement and/or fluctuations in RH %. This ties into the rest of the unit 1 and system 10, and associated software applications, because the chamber 2 actively vents itself using the negative airflow pressure and calculations of Vapor Pressure Differential relating to the surrounding controlled dry-room (as referred to above) in order to reduce the moisture content of the flower, or other plant materials, down to the Equilibrium Moisture Content.

Robotics System

The pathway that the air takes throughout the main chamber 2 and sub-chambers 3 (intake, exhaust) is explained above. The way in which air is channeled in the laminar flow method described is a function of the chamber/sub-chamber design and the relative placing of the components of the robot components, such as the fans 7, motors 6 with actuators 65, sensors 8 and the control system 10, including computer controller 102. In accord with the description above, these components of the invention and their functionality may be partially or fully automated via robotics. FIGS. 1, 6 and 7 illustrate a robotics system in accordance with at least one embodiment of the invention.

Listed below are the basic components of the robotics system which are including but not limited to:

CPU: Computer processor of the computer controller 102 which organizes and analyzes all the functions and commands of the software application loaded onto its hard-drive;

Computer Controller 102: Transfers information coming from the CPU into actionable responses for the air-flow components which are plugged into it;

Sensors 8 (e.g., DHT-22): Digital sensors fixed inside of the main chamber 2 to relay temperature and relative humidity readings to the CPU which are then displayed on the display 104, such as a touchscreen;

Motors 6 (preferable servo motors, including actuators 65): At least one for intake and one for exhaust to open and close the passages 24 when in a vent-period or off-period respectively;

Fans 7: Turn on during vent period and turn off when vent period ends;

Display 104: Displays the data and software application of the robot. Via the computer controller 102, it allows for user interface with the software application that controls the venting parameters. The display 104 is preferably mounted on the controller box 106 above or on the chamber 2. Any suitable displays and data and information input devices may be used (e.g., any variety of screens in addition to LCD (e.g., CRT, LED, ELD, PDP) and any variety of input devices in addition to touchscreen (e.g., keypads, mouses, etc.).

RH % Threshold 1043 and Control 1045: Preferably, this is controlled by a toggle slider on the display 104 (e.g., 0-100%) which allows the user to set when the unit 1 will vent with RH % being the active variable. For instance, if the RH % threshold control 1045 is set at 62%, then the unit 1 will vent itself whenever the readings from the sensors 8 reach and/or exceed 62%;

Time Threshold (aka Cycle Frequency control 1044): Preferably, this is controlled by a toggle slider on the display 104 (e.g., 0-24 hrs.), which allows the user or computer controller 102 to set when the unit 1 will vent, with time being the active variable. For instance, if the Time Threshold 1044 is set at 24 hours, then the unit will vent itself once per 24 hours. Conversely, if it is set to 1, then the unit 1 will vent itself once per hour;

Vent Duration 1046: A control, such as a toggle slider, on the display 104 (e.g., 15 seconds-60 min) which allows the user or computer controller 102 to set the period of time in which the fans 7 and motors 6 will remain in an active venting position after a threshold is met. For instance, if Vent Duration 1046 is set at 7 minutes, then the unit 1 will vent for 7 minutes when commanded to do so;

Temperature 1042 or Temperature Threshold: This is measured by the sensors, conveyed to the computer controller 102 and displayed via the display 104, and this threshold may also be used as part of the control of the venting and burping function.

Manual Cycle 1048: This refers to an override of automatic or otherwise computer controlled or preset thresholds (RH %, time, temperature) which will vent the unit 1 for the Vent Duration at the user's command.

FIG. 6 is an example of the display screen 104. As shown, it shows multiple toggle-sliders which can be adjusted by a user or predetermined by software and the computer controller 102. For example, based on the setting, the unit 1 can be controlled to burp/vent one time every 24 hours. Another setting can comprise RH % threshold and be set at 0% for example, so that the unit 1 burps continuously, because the sensor 8 readings are higher than 0%. Another setting may be the duration of time for which the burping/venting occurs, which by example may be at 0.25 min (15*s*). Also, as referenced above, preferably, there is also a Manual Cycle 1048 option, that can be used to override automatic settings and functions described above so as to burp/vent the unit 1 manual on command.

Preferably, the invention is self-monitoring and self-adjusting through the monitoring of environmental measurements via sensors 8 and a computer software application and the computer controller 102, variables for which are also displayed on the display 104 for the benefit of the user. A user may set various variables or setting to desired parameters, such as via digital sliders set to desired venting parameters. Controlled by the software and computer, the unit 1 of the invention will implement the settings in the chamber 2 environment. For example, preferably, the unit 1 of the invention can be set to vent via a Time Max Threshold (once every "X" number of hours), and a RH % Max Threshold (once sensor readings reach user-set RH %) for automated curing cycles. It may also be programmed with a Manual Cycle 1048 feature that allows the user to vent the machine at will. Drying and curing data generated from invention's vent cycles may also be logged to a secured online portal. Within this portal, users are able to add qualitative descriptions to the data including, for example, in the case of cannabis, strain information and other descriptive verbiage, in order to allow the user to analyze and standardize the curing process and the final product ready.

As examples of user or predetermined and/or programmable parameters, see below:

Cycle Frequency 1044: Based on a setting of Cycle Frequency 1044, the invention will vent itself once every "X" hours or other amount of time for the amount of time set on the Vent Duration slider (below). For example, if Cycle Frequency 1044 slider is set to 12, then the unit will vent itself once every 12 hours (twice per 24 hrs.)

RH % Threshold 1045 (aka, Humidity Max): The invention will vent itself once the internal RH % surpasses the value set on the slider. For example, if the RH % Max slider is set to 56, then the unit will vent itself once the internal RH % surpasses 56%.

Vent Duration 1046: Determines how long the unit will vent for. For example, if Vent Duration if set to 15 min, then the unit will vent for 15 minutes once it is triggered by either Time Max, RH %, or Manual Cycle 1048.

Manual Cycle 1048: The invention will vent itself at the user's or controlling program's command for the amount of time set on the Vent Duration slider. Once Manual Cycle 1048 is pressed, a "Q" will appear on the button which means the process will begin shortly.

Apply 1047: An indication of apply, e.g., "APPLY" in the preferred embodiment, must be pressed or otherwise selected after the user changes any slider values in order to lock in the new parameters.

Figure 8:
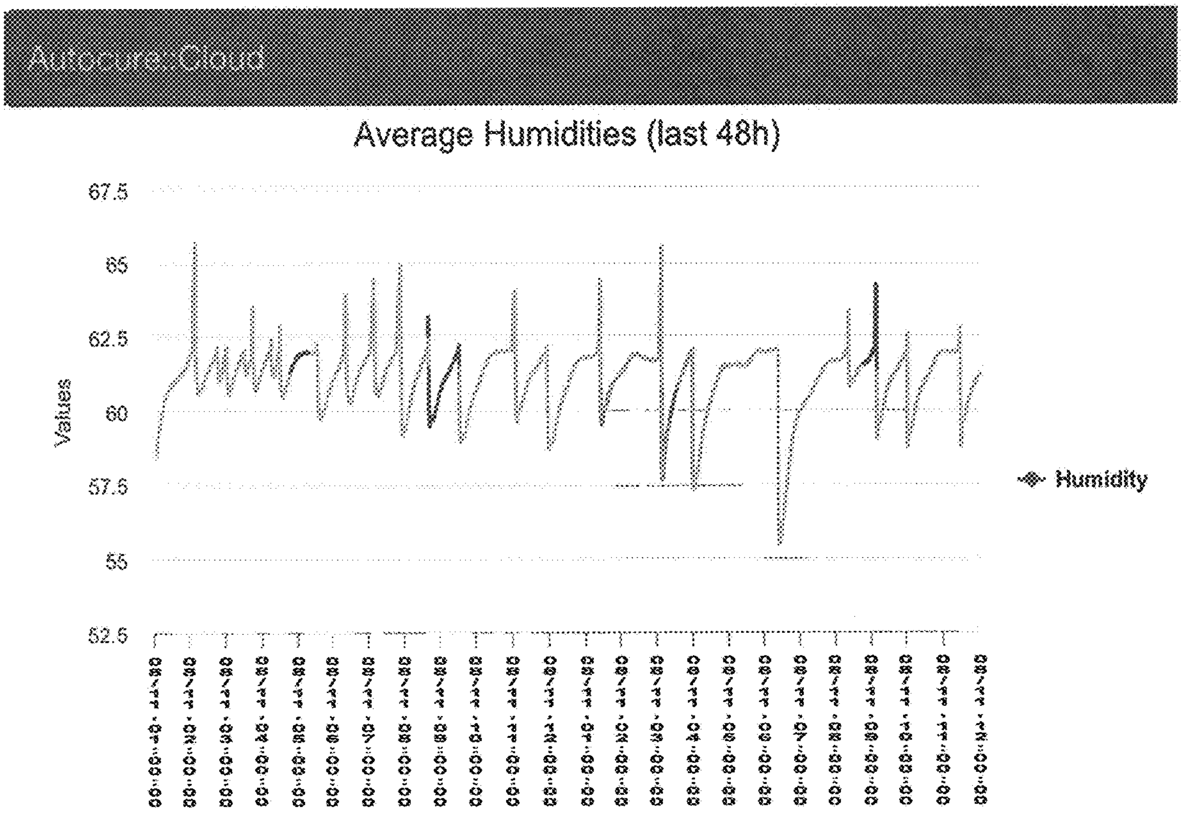
FIG. 8 illustrates a screen-shot for the system that acts as a platform to store the data from the invention.

By further example, FIG. 8 is a screen-shot for the system that acts as a platform to store the data from the invention:

In this preferred embodiment example, in order to change slider values on the display screen, the user preferably will select an Apply 1047 option immediately after changing the value(s).

The following features are also included in the invention:

Real time data logging and/or graphing, including by example as shown above in paragraph 79; and Control system 10 with software to control robotics in the network 140.

Computer Control System

FIG. 7 shows a block diagram depicting a typical computer control system 10 for managing the use of customized variable settings and laminar air flow dynamics via negative pressure to ensure the optimal curing and drying environment for materials. The control system 10 is only one example of a suitable computing environment and is not intended to suggest any limitation as to the scope of use or functionality of the invention. Neither should the control system 10 be interpreted as having any dependency or requirement relating to any one or combination of components illustrated in the exemplary control system 10.

The control system 10 and network system 11 may take various configurations within the scope and spirit of the invention. For example, the systems 10 and 11 may be configured to include and involve a communication platform 110, a management platform 101 (of which the computer controller 102 is a significant component), a user platform 120, and vendor/third party platform 130. The term "platform" as used herein refers to both distributed components across multiple locations and centralized components in one location. A platform may include components that are hosted by or services that are offered by other parties than those directed associated with each platform. For example, the components in the vendor platform 130 may be operated by the vendor associated with that platform and/or be operated by an agent of that vendor (e.g., a third-party service provider, etc.).

The communication platform 110 is configured to provide communication links among the various user and third party platforms 120 and 130. Examples of communication links include the Internet, private networks, local area networks (e.g., LAN, WiLAN, Wi-Fi, Bluetooth), cellular or other over-the-air wireless carrier interfaces, and other wired and wireless communication pathways.

As those skilled in the art will appreciate, various intermediary network routing and other elements between the network 140 and the platforms depicted in FIG. 7 have been omitted for the sake of simplicity. Such intermediary elements may include, for example, the public-switched telephone network (PSTN), gateways or other server devices, and other network infrastructure provided by Internet service providers (ISPs).

The management platform 101 is shown to include a database, memory and processor. Aspects of the management platform 101 may include: verification of a user and various target parameters for drying and curing, including without limitation, RH %, time and temperature, as well as information related to products to be dried or cured. In accordance with some embodiments of the present invention, the management platform 101 may operate as a digital rights verification system ("DRVS") that uses serialized authorization codes that specify digital rights regarding eligibility and other requirements or parameters regarding issuance of use rights to eligible users.

The third-party verification/authorization platform 130 represents administrative institutions for verifying the type of the user for carrying out transactions and for other activities. Verification of a user's type was previously discussed in relation to the description of verification module 3, and the relevant portions of that discussion are incorporated here by reference.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In accordance with certain aspects of the present invention, one or more of the process steps described herein may be stored in memory as computer program instructions. These instructions may be executed by a digital signal processor, an analog signal processor, and/or another processor, to perform the methods described herein. Further, the processor(s), the memory, the instructions stored therein, or a combination thereof may serve as a means for performing one or more of the method steps described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

Aspects of the present invention are typically carried out in or resident on a computing network. The computing network generally includes computer hardware components such as servers, monitors, I/O devices, network connection devices, as well as other associated hardware. In addition, the aspects and features described below may include one or more application programs configured to receive, convert, process, store, retrieve, transfer and/or export data and other content and information. As an example, these aspects and features may include one or more processors that may be coupled to a memory space comprising SRAM, DRAM, Flash and/or other physical memory devices. Memory space may be configured to store an operating system (OS), one or more application programs, such as a UI program, data associated with the pertinent aspect or feature, applications running on processors in the device, user information, or other data or content. The various aspects and features of the present invention may further include one or more User I/O interfaces, such as keypads, touch screen inputs, mice, Bluetooth devices or other I/O devices. In addition, the certain aspects and features may include a cellular or other over the air wireless carrier interface, as well as a network interface that may be configured to communicate via a LAN or wireless LAN (WiLAN), such as a Wi-Fi network. Other interfaces, such as USB or other wired interfaces may also be included.

As used herein, computer program products comprising computer-readable media including all forms of computer-readable medium except, to the extent that such media is deemed to be non-statutory, transitory propagating signals.

It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b and c.

While various embodiments of the present invention have been described in detail, it will be apparent to those skilled in the art that the present invention can be embodied in various other forms not specifically described herein. Therefore, the protection afforded the present invention should only be limited in accordance with the following claims.

The invention claimed is:

1. A system for drying and curing materials, the system comprising:

at least one chamber having multiple sides, defining an interior space and exterior space and having vented passages through at least a portion of said sides;

at least two sensors located in the interior of the chamber, one in connection with an air space of the chamber and one in connection with materials in the chamber, and in communication with a control system to convey measurements of the sensors;

a housing proximate each vented passage;

a motor and fan located proximate each housing, wherein each fan is oriented to direct air via the motor through the proximate vented passage into or out of the interior of the chamber wherein the motor activates the fan to open and close the vented passage and to vent the interior under direction of the control system; and wherein the control system directs the motor and fan based on sensor measurements and time.

2. The system of claim 1 wherein the chamber interior is essentially air tight when the vented passages are closed.

3. The system of claim 1 wherein the air directed through the chamber by the fan when the passages are open comprises laminar air flow.

4. The system of claim 1 wherein the chamber interior is further comprised of at least one sub-chamber wherein the sub-chamber is comprised of sides and openings defined by at least one side.

5. The system of claim 1 wherein the measurements collected by the at least two sensor are conveyed to the control system and control system directs each motor and each fan based on the measurements collected.

6. The system of claim 5 wherein the measurements collected by the at least two sensors are relative humidity of air within the chamber interior and moisture content of said materials.

7. The system of claim 5 wherein the control system is programmable and activates each motor and each fan to open and close the passages when chamber interior measurements meet certain predetermined levels.

8. The system of claim 5 wherein said materials are frozen upon harvest and placed in the chamber in a frozen state.

9. The system of claim 1 wherein the system is further comprised of a communication platform wherein the communication platform enables a user to monitor the chamber, program and monitor the sensor measurements and program the control system.

10. A machine for drying and curing organic material, the machine comprising:

at least one chamber having multiple sides, an interior and an exterior defined by at least a portion of said sides, at least a first passage in a first side and a second passage in a second side;

at least one sensor located in the interior of the chamber and in communication with a control system to convey measurements of the sensor;

a first flow housing and a second flow housing proximate to the exterior of the chamber, the first flow housing proximate to the first opening in the first side and defining a third passage and the second flowing housing proximate to the second opening in the second side and defining a fourth passage;

a first motor and first fan located in the first flow housing, wherein the first fan is oriented to direct air through the first passage to the interior of the chamber and wherein the first fan is proximate to the third passage;

a second motor and second fan located in the second flow housing, wherein the second fan is oriented to direct air away from a second passage to the exterior of the chamber and wherein the second fan is proximate to the fourth passage;

wherein the first and second motors and fans respectively open and close third and fourth passages and the first and second fans direct air through interior of the chamber under direction of a control system;

wherein the control system directs the motors and fans based on sensor measurements and time;

wherein the chamber interior is essentially air tight when the third and fourth passages are closed; and wherein the air directed through the chamber by the first and second fans when the third and fourth passages are open comprises laminar air flow.

11. The machine of claim 10 wherein the chamber interior is further comprised of at least one sub-chamber wherein the sub-chamber is comprised of sides and openings defined by at least one side.

12. The machine of claim 10 wherein the measurements collected by the at least one sensor are conveyed to the control system and control system directs the first and second motors and fans based on the measurements collected.

13. The machine of claim 12 wherein the measurements collected by the at least one sensor comprise relative humidity of air within the chamber interior.

14. The machine of claim 12 wherein the control system is programmable and activates the first and second motors and fans when the third and fourth passages are closed and the chamber interior measurement goes beyond a certain threshold whereby the first motors open the third and fourth passages open and the fans move air through the first and second passages and the interior of the chamber until the interior measurement drops below the threshold.

15. The machine of claim 12 wherein the control system is programmable and activates the first and second motors and fans when the control system measures a predetermined time setting whereby the third and fourth passages open and the fans move air through the first and second passages until the passage of a certain interval of time.

16. The machine of claim 10 wherein the system is further comprised of a communication platform wherein the communication platform enables a user to monitor the chamber, program and monitor the sensor measurements and program the control system.

* * * * *